June 19, 1934.  C. A. FUCHS  1,963,125
MOLD FOR PRODUCING TYPE CARRIERS OR SHUTTLES FOR TYPEWRITING MACHINES
Filed Aug. 15, 1931  9 Sheets-Sheet 1
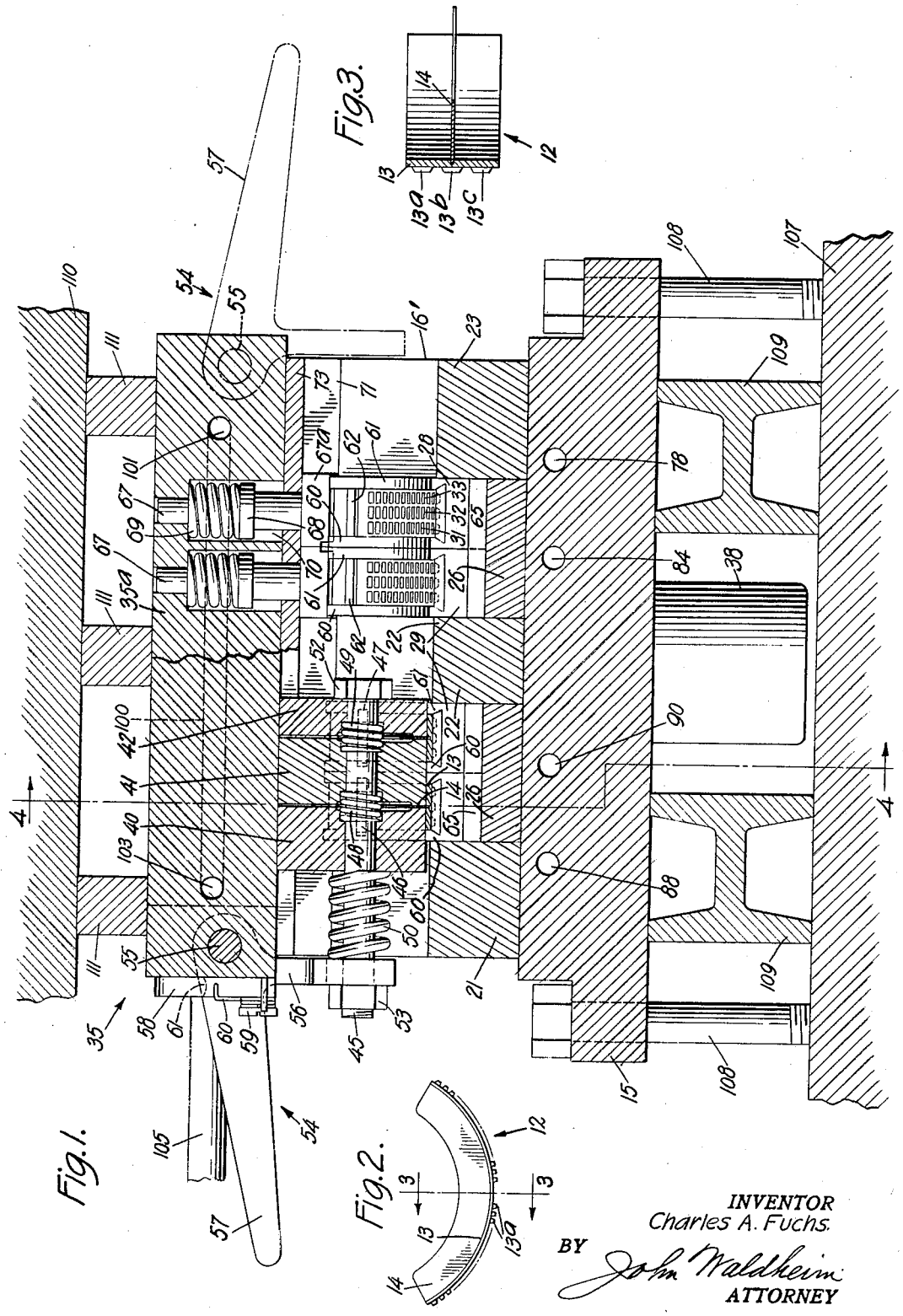
INVENTOR
Charles A. Fuchs.
BY John Waldheim
ATTORNEY

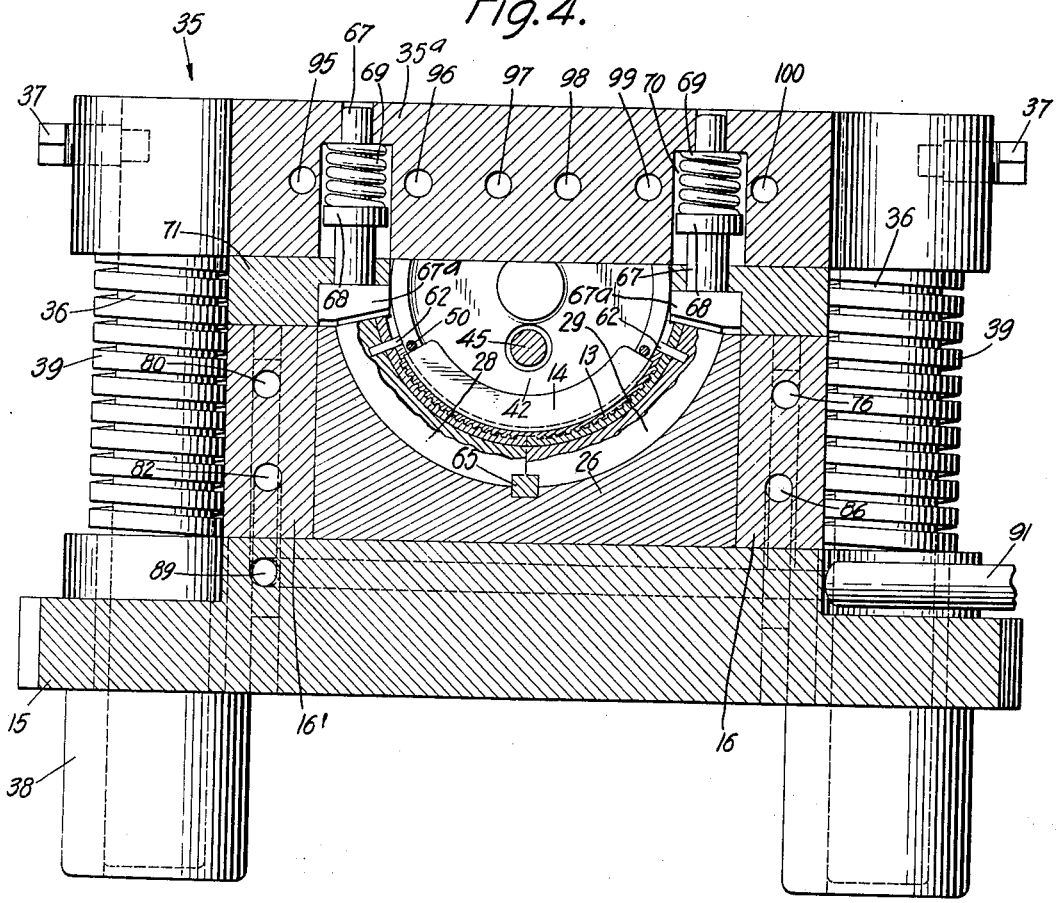

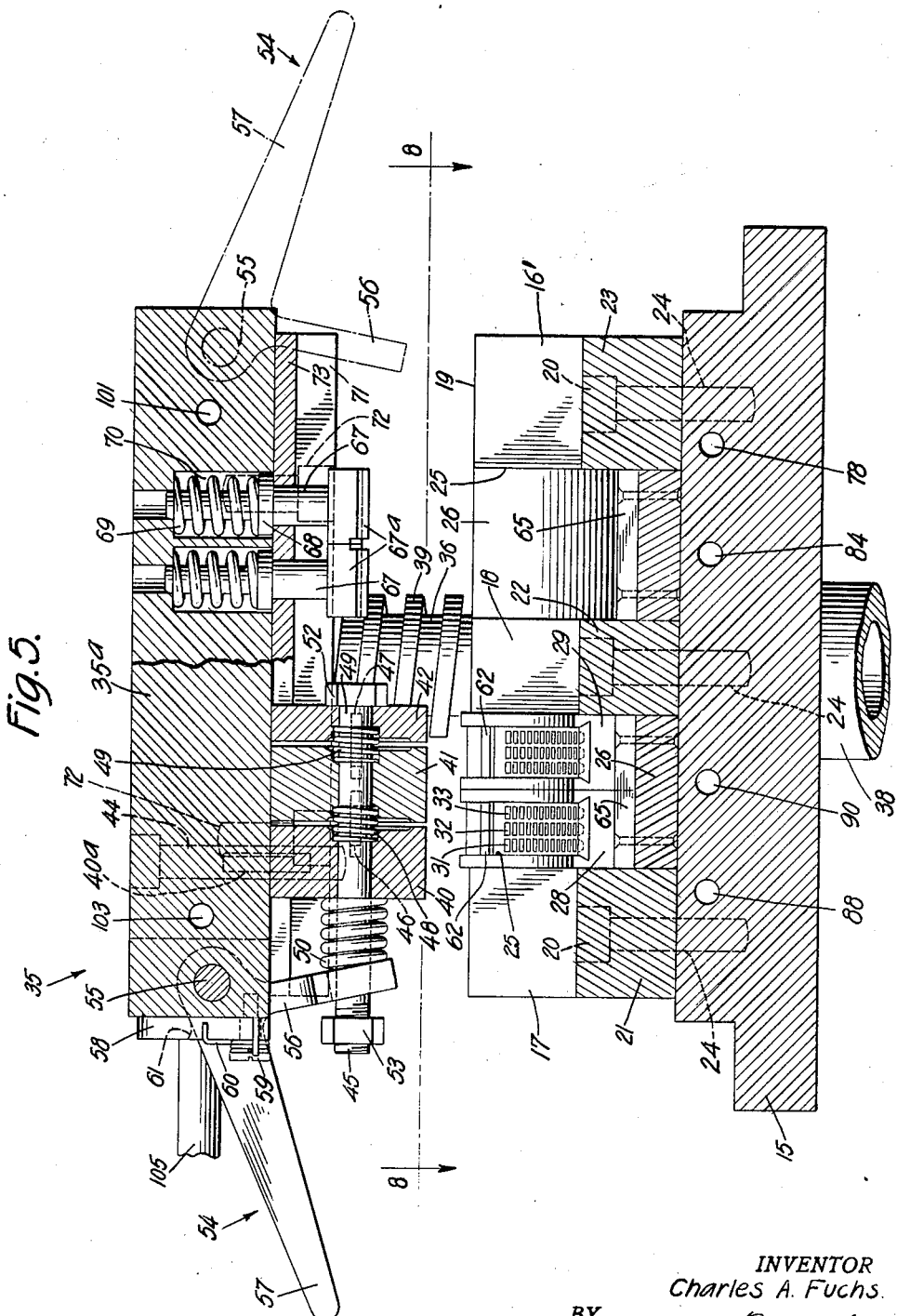

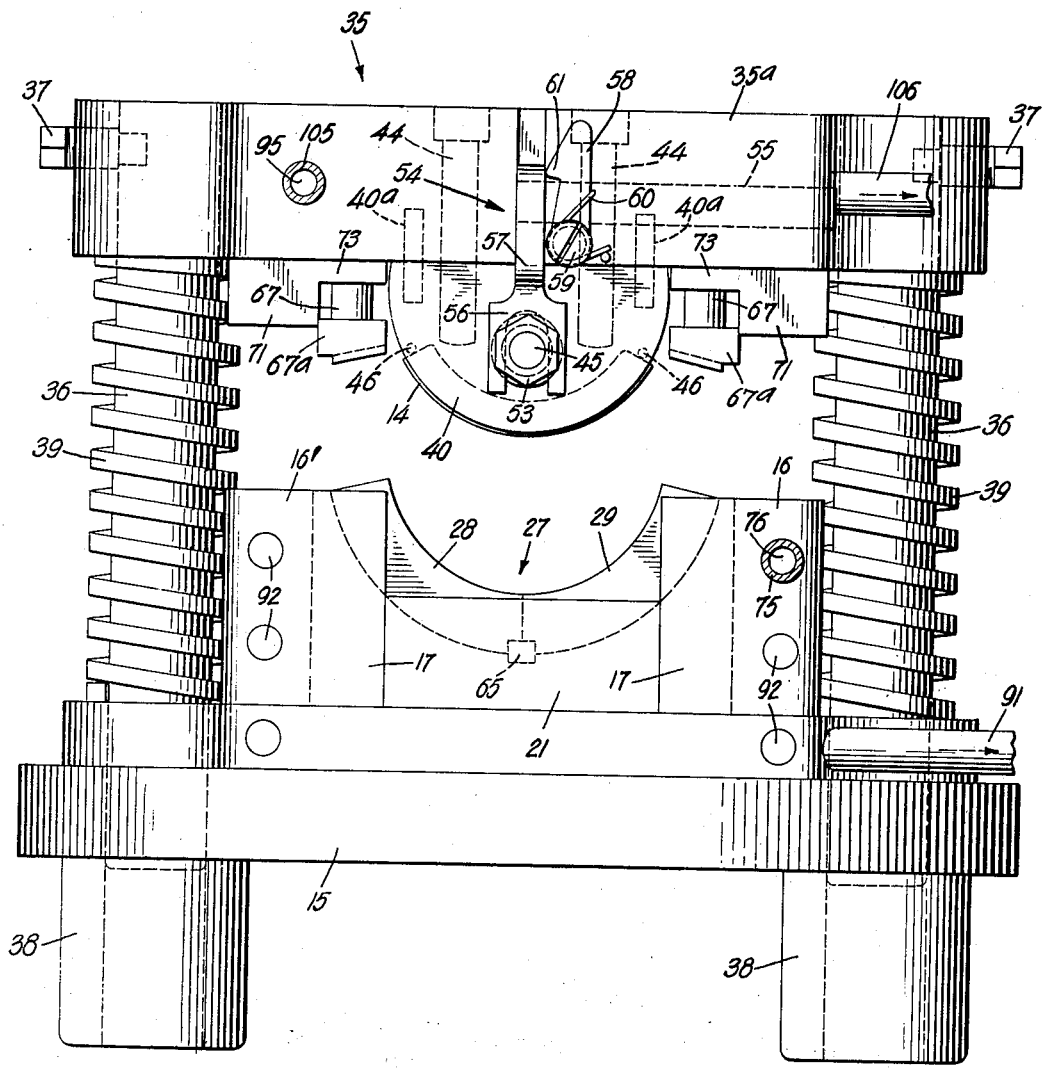

June 19, 1934.  C. A. FUCHS  1,963,125
MOLD FOR PRODUCING TYPE CARRIERS OR SHUTTLES FOR TYPEWRITING MACHINES
Filed Aug. 15, 1931  9 Sheets-Sheet 5

INVENTOR
Charles A. Fuchs.
BY John Waldheim
ATTORNEY

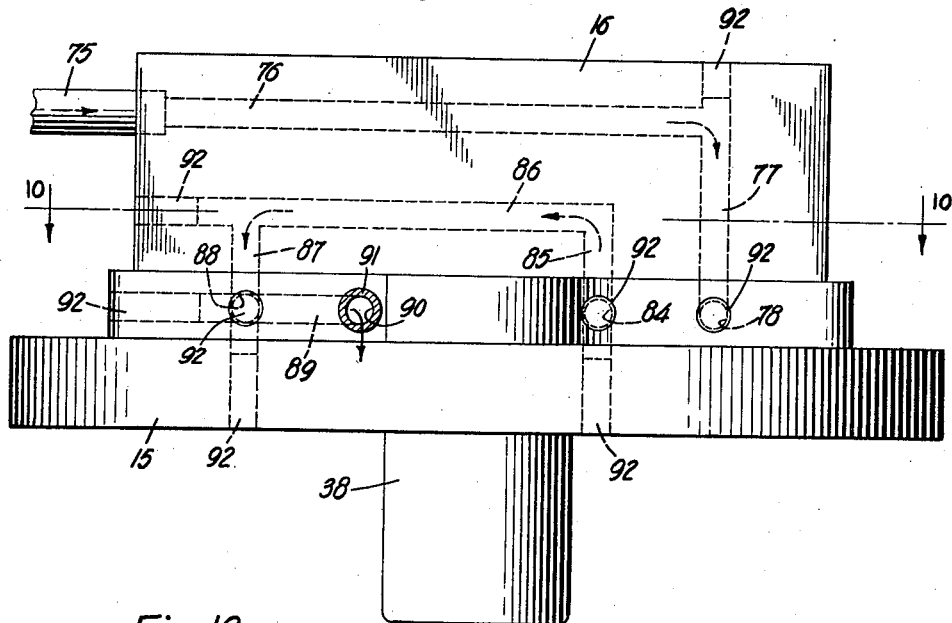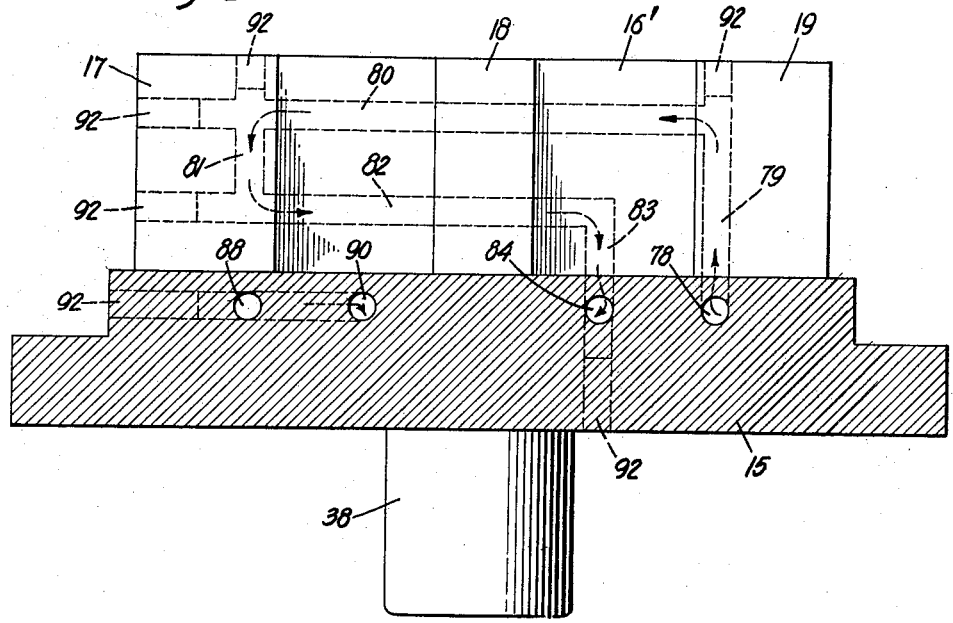

Patented June 19, 1934

1,963,125

UNITED STATES PATENT OFFICE 1,963,125

MOLD FOR PRODUCING TYPE CARRIERS OR SHUTTLES FOR TYPEWRITING MACHINES

Charles A. Fuchs, Hollis, N. Y., assignor, by mesne assignments, to Ralph C. Coxhead Corporation, New York, N. Y., a corporation of Delaware Application August 15, 1931, Serial No. 557,220

38 Claims. (Cl. 18—42)

This invention relates to means and the method for producing type carriers or shuttles, for typewriting machines, of the kind illustrated in the application of Charles A. Fuchs and Henry Resch, Serial No. 539,181 filed May 22, 1931, in which the shuttle comprises a type segment, composed of phenolic condensation product such as bakelite or condensite, and a flange thereon whereby the shuttle may be actuated and guided.

The means herein illustrated constitutes a mold including one or more matrices which are detachably supported on the base of the mold and are properly located thereon by suitable means.

The mold further includes a ram comprising a head upon which are supported ram segments to fit into and to co-operate with the concaved matrices to mold the type segments of the shuttles; each matrix being provided with types in intaglio on its concaved surface, suitable means being provided to guide the ram in its movement towards the base.

The ram segments are supported on the ram head in a manner to enable the flange blanks, which subsequently form the actuating flanges of the shuttles, to be clamped between them and locate them properly transversely of the matrices. The ram segments are provided with means for properly locating the flange blanks circumferentially of the matrices and for causing the outer edges of the flange blanks to protrude slightly beyond the faces of the ram sectors so that the type segment while being molded may be secured to the protruding edge of the flange web.

After previously formed pellets of powdered, uncured, phenolic condensation product such as bakelite or other suitable material, are placed in the matrices, the mold is heated until the pellets become plastic. The head and base of the mold are then pressed together, in a suitable press, to bring the matrices and the ram segments together to flow the plastic material around in channels formed between and by the matrices and the ram segments, to thus form the type segments of the shuttles. At the same time the protruding edges of the actuating segments are pressed into the material forming the type segments. The shuttle material is then subjected to heat for a predetermined period, while the mold is closed, to cure it. After curing, the mold is cooled and it may then be opened to remove the type shuttles.

Other features and advantages will hereinafter appear.

In the drawings,

Fig. 1 is a vertical, longitudinal, staggered section through the mold and showing it held between upper and lower pressure elements of a press;

Fig. 2 is a top plan view of the type shuttle;

Fig. 3 is a vertical section of the type shuttle taken on the line 3—3 of Fig. 2;

Fig. 4 is a vertical section taken on the line 4—4 of Fig. 2;

Fig. 5 is a view similar to Fig. 1, showing the ram of the mold raised and the ram segments released for the insertion of the flange blanks or segments between them, some of the matrices being removed from the matrix holder.

Fig. 6 is an elevation of the mold, showing the parts as viewed from the left-hand end of Fig. 5;

Fig. 11 is a longitudinal elevation of the matrix holder of the mold; and

Fig. 12 is a vertical section, of the matrix holder, taken on the line 12—12 of Fig. 10.

Similar reference characters represent similar parts throughout the several views.

Figure 7:
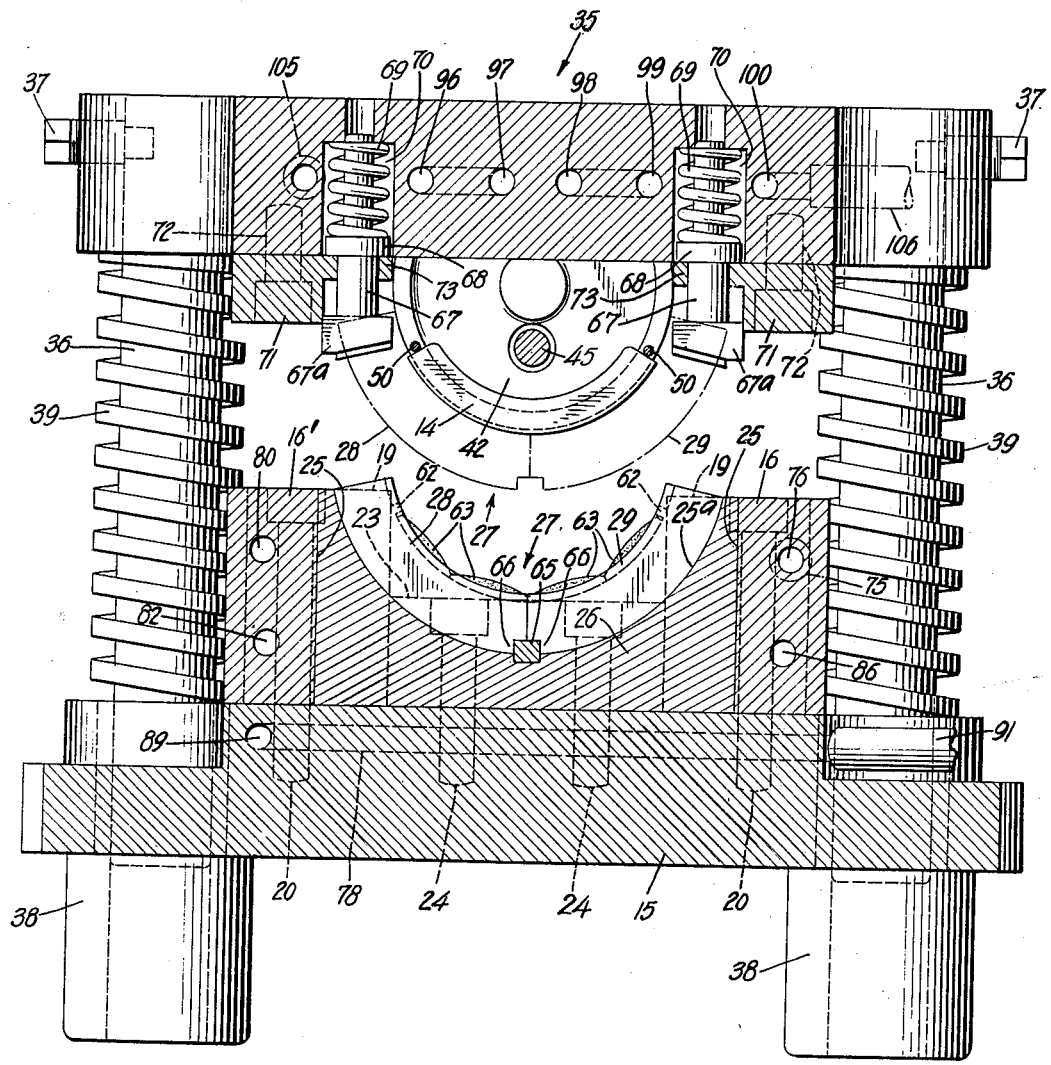
Fig. 7 is a sectional view, similar to Fig. 4, showing the mold parts separated as in Fig. 6.

The type shuttle 12, described in the above mentioned application, formed by the mold of this invention, comprises a type segment 13 (Figs. 2 and 3) having three rows of types 13ª, 13ᵇ and 13ᶜ and a flange or flat segment 14 (see Figs. 1 and 7 also).

Figure 8:
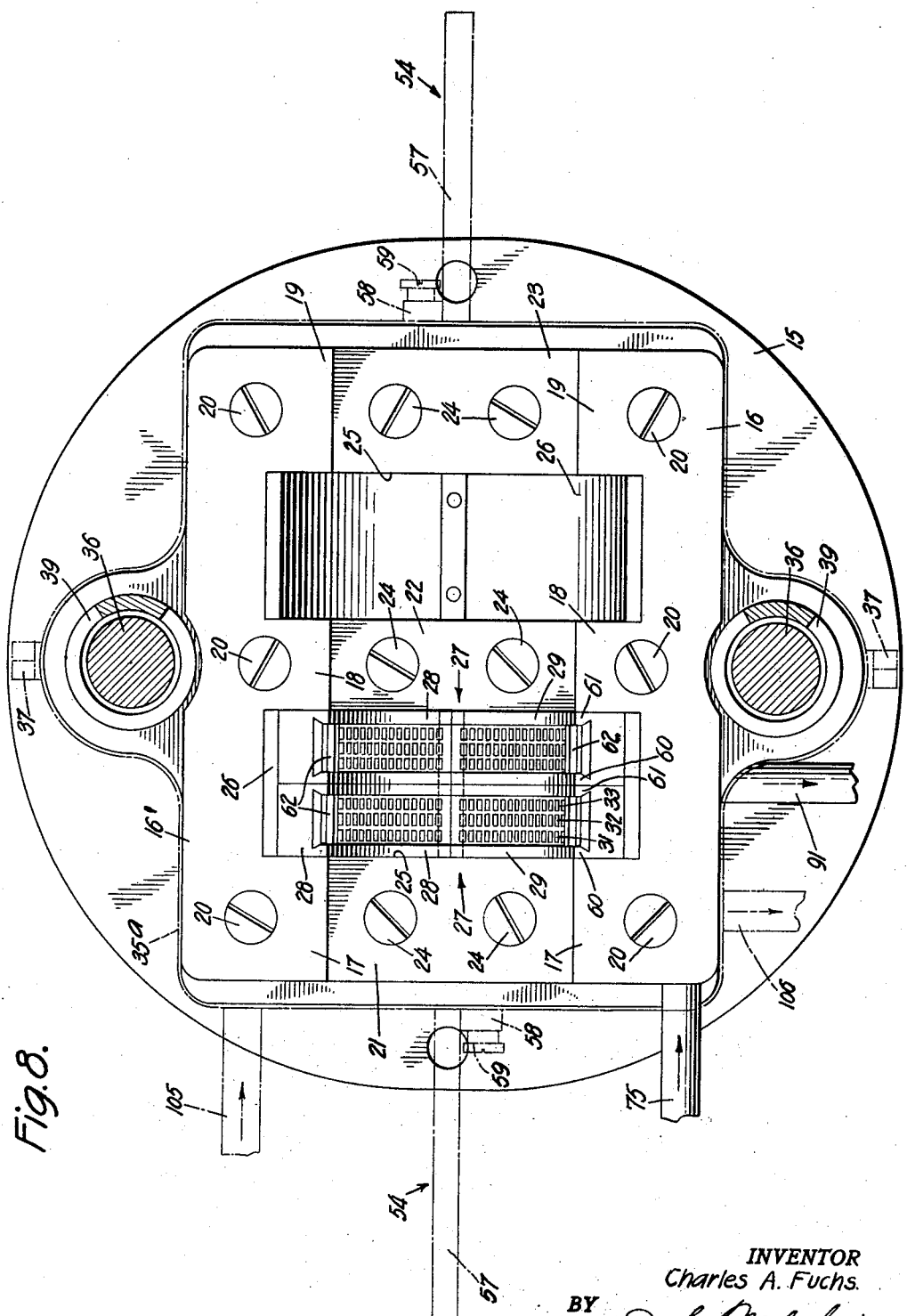
Fig. 8 is a sectional top plan view of the mold, taken on the line 8—8 of Fig. 5, and showing the matrix holder.

The mold includes a base 15 on which are supported E-shaped blocks 16 and 16' (Figs. 4, 8 and 10) having arms 17, 18 and 19, the blocks 16 and 16' being secured to the base 15 by screws 20. Between the ends of the arms 17, 18 and 19 are secured, to the base 15, blocks 21, 22 and 23 by screws 24.

The blocks 16 and 16', together with the blocks 21, 22 and 23, form rectangular cavities 25 in which are located supports 26 to provide a curved bottom 25ª in the cavities 25 and upon which the curved matrices 27 rest, each cavity 25 having a group of two matrices, placed side by side, therein. Each matrix is composed of two sections 28 and 29 for reasons hereinafter stated and has three rows of types 31, 32 and 33 formed thereon in intaglio.

The ram 35 of the mold has secured thereto posts 36 by screws 37, said posts engaging in bushings 38, secured to the base 15, to guide the ram for movement towards and away from the base to close and open the mold, springs 39 being provided which tend to open the mold.

The ram 35 has two sets of ram segments, each set including segments 40, 41 and 42, the segment 40 of each set being located on the ram head 43 by dowel pins 40ª and being secured to said head by screws 44 passing through the head 35ª and threaded into said segment (Figs. 5 and 6). The segments 40, 41 and 42 are placed end to end, the latter two segments being supported on a bolt 45, passing through all of the segments, for endwise movement, the intermediate segment 41 being guided on the fixed segment 40 by pins 46 and the end segment 42 being guided similarly on the intermediate segment by pins 47.

The ram segments are provided to grip the web-like segments or flange members 14 therebetween, these flange members being previously formed out of sheet material of any suitable kind. These flange members are inserted between the ram segments 40, 41 and 42 which are held separated from each other, in Fig. 5, by interposed springs 48 and 49 supported on the bolt 45. The flange members are located circumferentially on the ram segments by the pins 46 and 47 (Figs. 5 and 6) with which the ends of the flange members engage.

The ram segments of each set may be drawn together, to grip the flat segments 14 therebetween, by a spring 50 through the medium of the bolt 45 which is provided with a head 52, at its inner end, to engage the end segment 42, and a nut 53 on the outer end against which the spring 50 acts.

To release the ram segments, or in other words, effect a separation thereof, there is associated with each set a lever 54 pivoted by a stud 55 on the ram head 35ª. Each lever 54 has a downwardly extending arm 56 which is bifurcated as in Fig. 6 to straddle the bolt 45 and engages between the nut 53 and the spring 50 as in Fig. 1. Upon the depression of the handle 57, of the lever 54, the spring 50 is compressed as in Fig. 5, thus permitting the springs 48 and 49 to separate the ram segments for the purpose of inserting the flat segments 14 between them.

It is desirable to lock each release lever 54 in its operated position so that the hands of the operator may be free to insert the flange segments 14. To this end there is provided for each lever 54 a pawl 58 pivoted on a shouldered screw 59, secured to the head 35ª and about which it may be swung, by a spring 60, to carry a nose 61 thereof over the handle 57 of the release lever, as in Fig. 5, to thus hold said lever in its operated position. To release the lever 54 from this position, when it is desired to grip the flat segments 14, it is merely necessary to swing the pawl 58 free of the lever 54 whereupon the spring 50 returns the lever 54 to normal and presses the arm 56 of said lever against the nut 53 to draw the bolt 45 outwardly to draw the ram segments 40, 41 and 42 tightly against each other, the springs 50 being sufficiently strong to overcome the action of the springs 46 and 47 and also produce a firm clamping action, of the ram segments, on the flange segments 14.

Each matrix is provided with two flanges 60 and 61, one extending along each edge, these being engaged by the convexed faces of the ram sector to form with said matrices curved ducts in which the type shuttles 13 are formed. The ram segments 40, 41 and 42 are located with respect to the matrices so that the flat segments 14, held thereby, come substantially to the middle of the matrices.

After the segments 14 have been clamped in place on the ram, pellets 63 (Fig. 7) of powdered, uncured phenolic condensation product such as bakelite or other suitable material are heated in the matrices, in a manner hereinafter described, until the bakelite becomes plastic. The ram is then lowered to press the protruding edges of the segments 14 into the bakelite and to force the plastic material around in the channels formed by the matrices and the ram segments. Dams 62 are provided at the ends of each matrix to form closures for the channels and thus prevent escape of the plastic material under pressure. While the material is under pressure the heating of the mold continues for a period of time to cure the material forming the type segments and to unite it with the segment 14 which may be composed of bakelite molded cloth, thus forming an integral structure. The mold is then cooled, in a manner hereinafter described, and is subsequently opened to remove the freshly molded shuttles 12.

The matrices cling to the shuttles after molding and consequently they are lifted with the shuttles out of the cavities 25 while the ram is being raised, as indicated in dotted lines in Fig. 7. The release levers 54 are then successively operated to effect the separation of the ram segments 40, 41 and 42 so that the shuttles 12, with the matrices still clinging thereto, drop to the operator's fingers which reach thereunder. The matrix sections 28 and 29 may then be readily pulled from the shuttle. It will readily be understood that it would be impossible to remove the matrix from the shuttle, without destroying the types, if it consisted of one piece. Consequently each matrix is composed of two sections 28 and 29 to facilitate removal from the shuttle.

To locate these matrices properly in the cavities 25 so that they will bear the proper relation circumferentially with respect to the segments 14, there is provided in the bottom of each cavity an abutment or stop 65 with which shoulders 66 of the matrix sections, engage (Fig. 7).

Provision is made to press these matrix sections towards each other and against the stop 65 to insure proper positioning thereof in view of the fact that the types produced on the shuttle by the one section 28 must be accurately spaced with respect to those produced by the other section 29. For this purpose two gangs of plungers 67 are provided to engage the ends of the matrix sections, each plunger being provided with a head 67ª and a flange 68. A spring 69, in a cavity 70 of the ram head 40, engages the flange 68 to press the plunger downwardly. Associated with each set of plungers is a bar 71, secured to the ram head 35ª by screws 72 (Figs. 5 and 7). Each bar has a flange 73 against which all of the flanges 68 bear to arrest the plungers 67 in their protruded positions.

During the latter part of the lowering operation of the ram, the plunger heads 67ª engage the ends of matrix sections 28 and 29 to press them towards each other to properly locate them against the abutment 65. Said heads 67ª of the spring-pressed plungers engage the flanges 73 when the mold is closed (Fig. 4) and thus prevent spreading of the matrix sections 28 and 29 which may otherwise result while the plastic material is being pressed around in the arcuate channel formed by the matrix and the ram segments.

Figure 10:
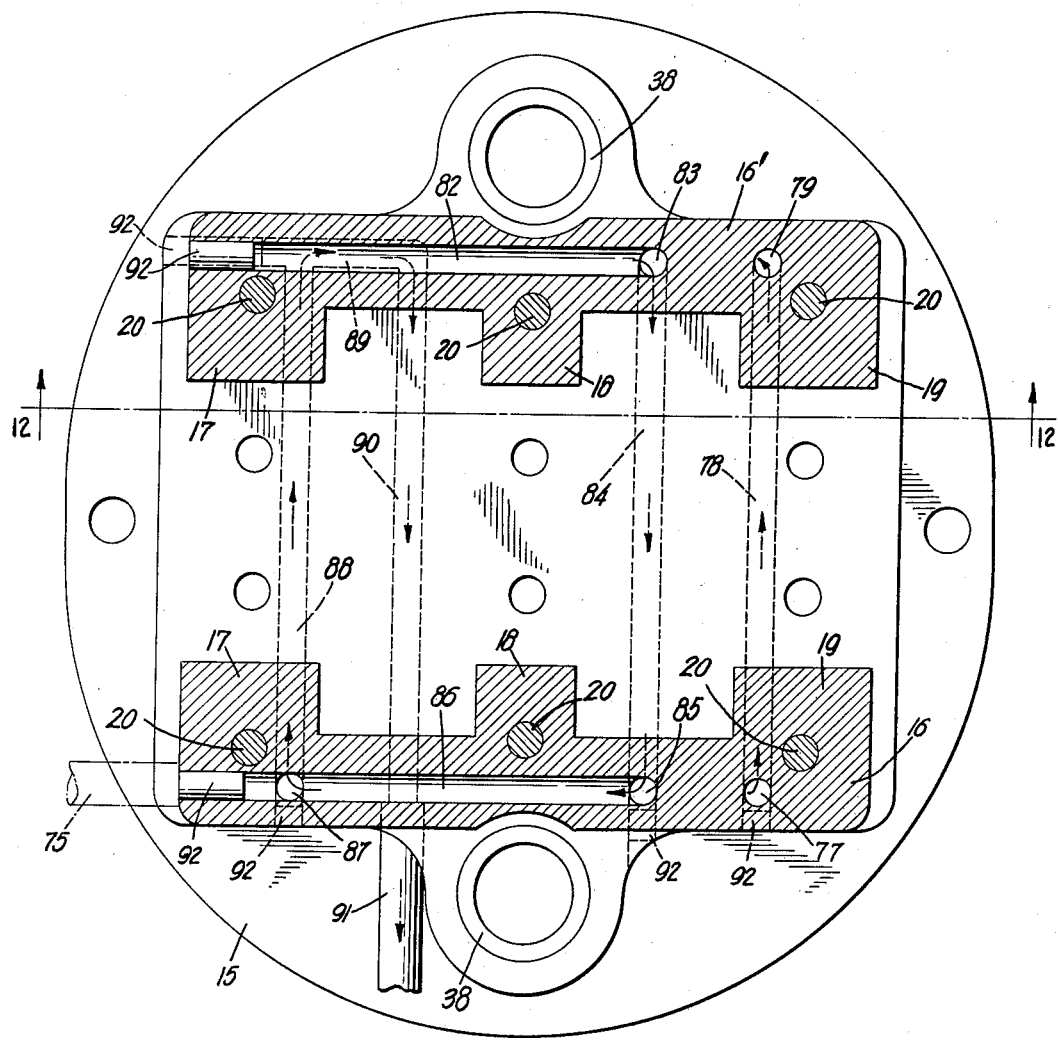
Fig. 10 is a sectional top plan view of the matrix holder, taken on the line 10—10 of Fig. 11, showing the heating and cooling ducts therein.

To heat the mold, the matrix holder and the ram are each provided with a series of passages or ducts through which a suitable heating fluid such as steam is passed. The steam is conducted into the block 16, of the matrix holder, by a pipe 75 (Figs. 6, 8, 10 and 11). From the pipe 75 the steam passes through a horizontal passage 76, then down through a vertical passage 77, and through a passage 78 which extends transversely through the base 15 to the other side thereof (Figs. 10 and 12). The steam passes upwardly from the duct 78 through a vertical passage 79 in the block 16' and then horizontally through a passage 80 in the upper part of said block. From the passage 80 the steam is conducted downwardly through a vertical passage 81 to a horizontal passage 82, then to a vertical passage 83 communicating with a horizontal transverse passage 84 through which the steam passes back to the opposite side of the mold. At this latter side of the mold the steam passes upwardly from the duct 84 through a passage 85 (Fig. 11) and then through a passage 86 extending horizontally in the lower part of the block 16. A vertical passage 87 conducts the steam downwardly to a transverse passage 88 in the base 15. At the other side of the mold the steam passes from the duct 88 through a short passage 89 to a transverse passage 90 to which is connected an outlet pipe 91. These various passages 76 to 90, inclusive, may be formed by drilling to the proper depth and then closing the ends with plugs 92 which may be secured in any convenient manner.

Figure 9:
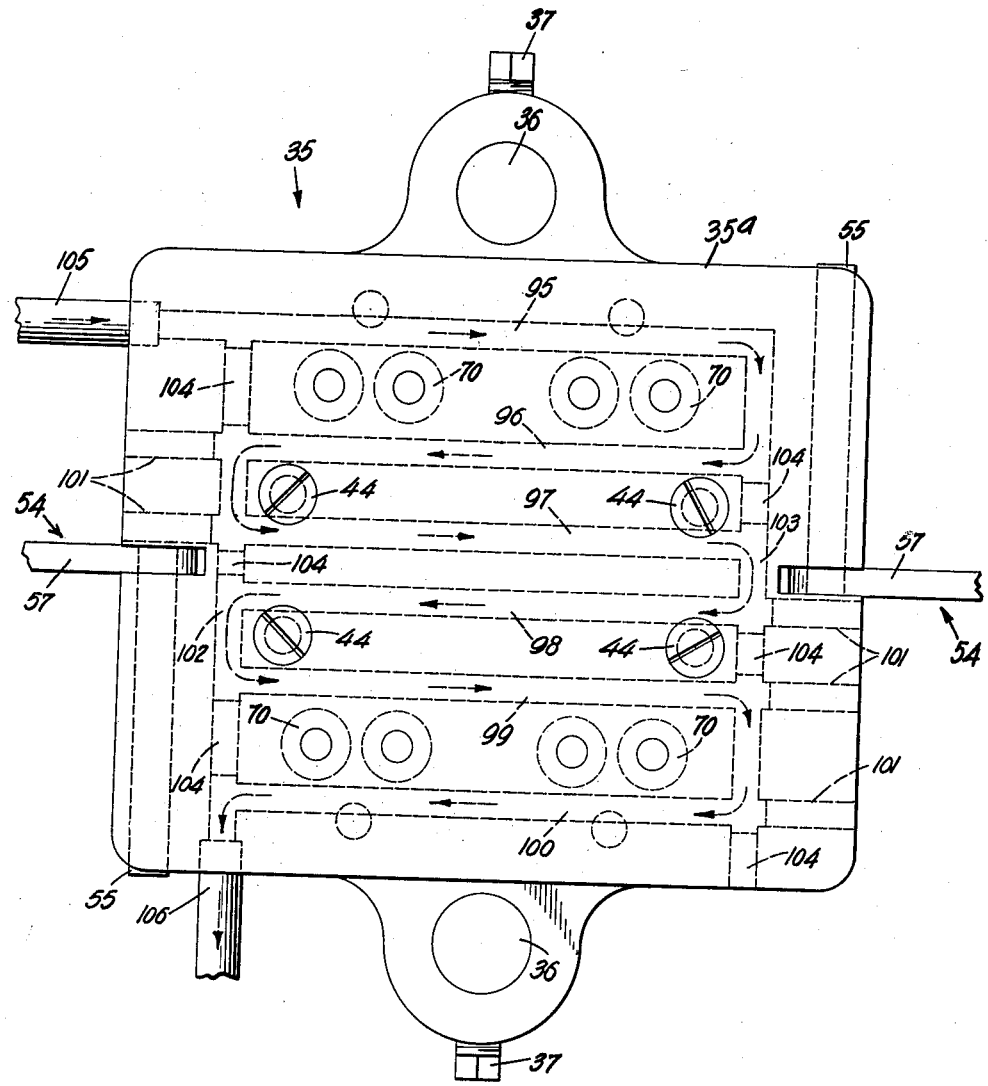
Fig. 9 is a top plan view of the ram, showing the heating and cooling passages or ducts therein.

To heat the ram 35 it is provided with passages through which the heating fluid is conducted. These passages are formed by drilling holes 95, 96 and 97 (Fig. 9) from one side of the head 35ª and holes 98, 99 and 100 from the other side, and then inserting plugs 101 in the ends of the holes 96, 97, 98, 99 and 100. Transverse holes 102 and 103 are drilled from one end through the holes 95, 96, 97, 98, 99 and 100. Plugs 104 are then placed in the holes or ducts 102 and 103 so that the steam, which is led into the ram by a pipe 105, follows a snake-like path, indicated by the arrows, through the various passages. The steam is conducted out of the ram head through a pipe 106 inserted in one end of the hole or passage 102.

Suitable valves (not shown) may be inserted in the inlet pipes 105 (Fig. 9) and 75 (Fig. 11) whereby the steam may be cut off and a cooling fluid, such as water, admitted to flow through the same passages used for the heating fluid. The mold parts through which the steam and water are conducted are composed of steel so as to be water tight and prevent leakage of the fluid from the passages therein.

It will be understood that the matrices are bordered by passages beneath, at the sides and above, for the purpose of heating the bakelite material and for the purpose of cooling the shuttle after molding and curing.

The mold may be operated in any suitable press, the base 15 of said mold being secured to the lower jaw or bed 107 (Fig. 1) by bolts 108 or any other suitable means. H-bars 109 may be located between the base 15 and the jaw to form a substantial support therefor and to keep at a minimum the transfer of the heat from the mold to the press. An upper jaw 110 of the press may be the movable one and actuates the ram downwardly through the medium of suitable bars 111. It will be understood that while the upper jaw 110 of the press moves upwardly the springs 39 press the head 35ª of the ram upwardly to open the mold, the matrices 27 being drawn out of the mold cavities 25, as indicated in dot-and-dash lines in Fig. 7, because they adhere to the freshly formed shuttles.

The operator then reaches in under the matrices at one end of the mold, as above explained, and then depresses the handle 57 at the same end to effect the spreading of the ram segments 40, 41 and 42 to release the shuttles with their matrices still adhering thereto. It will be understood that the spring pressed plungers assist in removing the shuttles from the ram when the ram segments or jaws are released. After the shuttles are taken out of the mold the matrix sections 28 and 29 may readily be removed from each shuttle. Subsequent to the removal of the shuttles from one end of the mold those at the other end may be taken out in a similar manner.

It is important that the flange or web 14 of the shuttle be always in the same position on the various shuttles with respect to the rows of types, so that the typing produced by one shuttle will align with that produced by another shuttle used in the same machine; the interchangeability of shuttles to effect different kinds of typing on the same work sheet being a feature of the Varityper writing machine in which these shuttles are used.

This is one of the reasons for arranging the ram segments or web holders 40, 41 and 42 and their associated matrices in groups of small numbers, which makes it impossible to accumulate any slight inaccuracy, due to variation in thickness of stock from which the webs 14 are made, or foreign matter adhering thereto or to the clamping faces of the ram segments, or other causes, such as inaccuracies in the width of the matrices, which would accumulate if each group contained a great number of ram segments and matrices, and thus cause a noticeable inaccuracy in the positions of the webs on the shuttles produced by the ram segment and the matrices farthest removed from the fixed segment 40.

Each group in the present invention consists of two matrices, with which there are associated three ram segments, two end segments 40 and 42, and the intermediate segment 41. The latter co-operates with both matrices, extending over half of each, as in Fig. 1, and the end segments 40 and 42 extend over the other half of each of the matrices. Thus the number of ram segments in each group is one greater than the number of matrices.

While certain preferred embodiments of the invention have been described, it will be understood that changes in the form, arrangements, proportions, sizes and details thereof may be made without departing from the scope of the invention as defined in the appended claims.

I claim:—

1. In a mold for producing a type shuttle comprising a type segment and a segmental flange thereon, the combination of a matrix, a holder therefor, means on said holder to accurately position the matrix on the holder, a ram element including segments between which the flange segment may be held, and means for positioning the flange segment circumferentially of the ram segments, the matrix and the ram segments being adapted to form a curved duct between them, means to press the holder element and the ram element together to press moldable material previously introduced into the matrix around in the curved duct formed by the matrix and the ram segments, and means on one of said elements to guide the other one relatively thereto.

2. In a mold, the combination of a concaved matrix, said matrix having a channel-shaped groove on its concaved face, types formed in the bottom of the groove, a ram including segments having convexed surfaces adapted to co-operate with the matrix to form a closed channel, means to clamp the ram segments together to grip a flat segment therebetween, means to position the flat segment on the ram segments so that it protrudes slightly beyond the convexed faces of the ram segments and into the channel, means to press the ram against the matrix to force material in a plastic state around in said channel, and means to guide the ram relatively to the matrix.

3. In a mold, the combination of a concaved matrix, said matrix having a channel-shaped groove on its concaved face, types formed in the bottom of the groove, a ram including segments having convexed surfaces adapted to co-operate with the matrix to form a closed channel, means to clamp the ram segments together to grip a flat segment therebetween, means on the ram to position the flat segment circumferentially of the ram segment, the matrix comprising two sections placed end to end, a holder for said sections, a stop on the holder to position the matrix sections circumferentially of the flat segment, shoulders on the adjoining ends of the matrix sections to engage the stop, means to press the ram against the matrix, and resiliently supported devices on the ram to press the matrix sections against the stop.

4. In a mold, the combination of a concaved matrix, said matrix having a channel-shaped groove on its concaved face, types formed in the bottom of the groove, a ram including segments having convexed surfaces adapted to co-operate with the matrix to form a closed channel, means to clamp the ram segments together to grip a flat segment therebetween, means on the ram to position the flat segment circumferentially of the ram segments, a holder, an arcuate groove in said holder into which the matrix fits, means in said groove to locate the matrix circumferentially, means on one of the ram segments to locate the flat segment circumferentially of the matrix and to cause the edge of the flat segment to protrude slightly beyond the faces of the ram segments, means to press the ram against the matrix to force plastic material around in the channel, and means to prevent displacement of the matrix.

5. In a mold for forming a type segment on a segmental web, the combination of a plurality of matrices, a holder therefor, the holder having an arcuate groove therein, each matrix being arcuate and each having types on its concaved face, all of the matrices fitting into said groove and being located side by side, each matrix comprising two sections placed end to end, a single locator to position all of the matrix sections circumferentially in the groove, a ram, a plurality of segments on the ram to form with the matrices a plurality of arcuate chanels, means for clamping the webs between the ram segments, means to locate the webs on the ram segments circumferentially of the matrices and to cause the outer edge of the webs to extend slightly beyond the curved faces of the ram segments, means to move the ram against the matrices, and means to guide the ram relatively to the matrices.

6. In a mold for forming a type segment on a segmental web, the combination of a matrix, a holder therefor, the holder having an arcuate groove therein, the matrix being arcuate and having types on its concaved face, the matrix fitting into said groove, the matrix comprising two sections placed end to end, a locator to position the matrix sections circumferentially in the groove, a ram, a plurality of segments on the ram to form with the matrix an arcuate channel, means for clamping the web between the ram segments, an abutment to be engaged by the two sections of the matrix to position it circumferentially of the flat segment, means to guide the ram for movement towards the holder, and two spring-pressed plungers on the ram to engage the ends of the matrix sections to press them towards each other and against the abutment while the ram is being moved towards the holder.

7. In a mold for producing curved type shuttles, the combination of a bed having an arcuate depression therein, an arcuate matrix in said depression, a ram disposed above said bed, said ram including two ram segments conforming to the shape of the matrix and to form with the matrix an arcuate channel, means to clamp a flange blank between the ram segments with the edge of the blank protruding slightly beyond the curved faces of the ram segments, and means to move the ram tightly against the bed to press material which is temporarily in a plastic state around in the channel and to embed the exposed edge of the web-like segment into the plastic material.

8. A mold to form a type shuttle having a type segment and a segmental web thereon, said mold including a matrix, a holder therefor, a ram head, a ram segment fixed to said head, a bolt extending through the ram segment, a floating ram segment on said bolt, means on one of the ram segments to locate the web portion between the ram segments, and means whereby the floating segment may be pressed tightly towards the fixed segment to clamp the web therebetween.

9. A mold to form a type shuttle having a type segment and a segmental web thereon, said mold including a matrix, a holder therefor, a ram head, a ram segment fixed to said head, a bolt extending through the ram segment, a floating ram segment on said bolt, means on one of the ram segments to locate the web portion between the ram segments, means whereby the floating segment may be pressed tightly towards the fixed segment to clamp the web therebetween, and a spring between the ram segments tending to separate them.

10. A mold to form a type shuttle having a type segment and a segmental web thereon, said mold including a matrix, a holder therefor, a ram head, a ram segment fixed to said head, a bolt extending through the ram segment, a floating ram segment on said bolt, means on one of the ram segments to locate the web portion properly between the ram segments, a spring acting on said bolt to urge it axially to press the floating segment toward the fixed segment to clamp the web therebetween.

11. A mold to form a type shuttle having a type segment and a segmental web thereon, said mold including a curved matrix, a holder therefor, a ram head, a ram segment fixed to said head, a bolt extending through the ram segment, a floating ram segment on said bolt, means on one of the ram segments to locate the web portion circumferentially of the matrix between the ram segments, a spring acting on said bolt to urge it axially to press the floating segment toward the fixed segment to clamp the web therebetween, a lever pivoted on the ram head to overcome the action of said spring, a spring to spread the ram segments, and means to hold said lever in its active position.

12. A mold to form a type segment on the edge of a segmental web, said mold including a plurality of concaved matrices placed side-by-side, a holder for said matrices, a ram head, a ram segment secured to the head, a plurality of ram segments floatingly supported on the ram head for end to end movement towards each other and towards the fixed segment, the ram segments to form a channel with the matrices, means whereby the ram segments may be drawn tightly together to clamp the segmental webs therebetween and to hold them with respect to the matrices, and means to so position the segmental webs on the ram that the edges thereof extend beyond the ram segments and into the channel when the latter is formed.

13. A mold to form a type segment on the edge of a segmental web, said mold including a plurality of concaved matrices placed side by side, a holder for said matrices, a ram head, a ram segment secured to the head, an intermediate ram segment, dowel pins to movably support the intermediate segment on the fixed segment and to guide it relatively thereto, an end segment, dowel pins to movably support the end segment on the intermediate segment and to guide it relatively thereto, all of the dowel pins being effective to properly locate the segmental webs between the ram segments, and a bolt extending through the ram segments whereby they may be drawn tightly against each other to clamp the segmental webs therebetween.

14. A mold to form a type segment on the edge of a segmental web, said mold including a plurality of concaved matrices placed side by side, a holder for said matrices, a ram head, a ram segment secured to the head, an intermediate ram segment, an end ram segment, means to floatingly support the intermediate and the end ram segments on the ram head, a bolt extending through all of the ram segments whereby said segments may be pressed against each other to hold segmental webs therebetween, and springs between the ram segments tending to separate them.

15. A mold to form a type segment on the edge of a segmental web, said mold including a plurality of concaved matrices placed side by side, a holder for said matrices, a ram head, a ram segment secured to the head, an intermediate ram segment, an end ram segment, means to floatingly support the intermediate and the end ram segments on the ram head, a bolt extending through all of the ram segments whereby said segments may be pressed against each other to hold segmental webs therebetween, springs between the ram segments tending to separate them, a spring to actuate the bolt to overcome the action of the springs between the ram segments, and a lever to overcome the action of the bolt actuating spring.

16. In a mold, the combination of a concaved matrix, said matrix having a channel-shaped groove on its concaved face, types formed in the bottom of the groove, a ram, including segments having convexed surfaces adapted to co-operate with the matrix to form a closed channel, means to clamp the ram segments together to grip a flat segment therebetween, means to position the flat segment on the ram segments so that it protrudes slightly beyond the convexed faces of the ram segments and into the channel, means to press the ram against the matrix to force material in a plastic state around in said channel, means to guide the ram relatively to the matrix, the material which forms the type shuttle adhering to the flat segment when it solidifies, the matrix holding on to the type segment to be lifted from the holder while the ram is being moved away from the holder to open the mold, and means to remove the type segment with the matrix from the ram when the ram segments are separated.

17. In a mold for forming a type segment on a segmental web, the combination of a plurality of matrices, a holder therefor, a holder having an arcuate groove therein, each matrix being arcuate and each having types on its concaved face, all of the matrices fitting into said groove and being located side by side, each matrix comprising two sections placed end to end, a single locator to position all of the matrix sections circumferentially in the groove, a ram, a plurality of segments on the ram to form with the matrices a plurality of arcuate channels, means for clamping the webs between the ram segments, two gangs of plungers, one gang at each side of the matrices, a spring for each plunger to press it against the end of the matrix, the ram having apertures to house the plunger springs and the plungers extending through said apertures, a bar associated with each gang of plungers to close the apertures and to assist in guiding the plungers, and a flange on each plunger to engage the bar to limit the movement of each plunger under the influence of the spring.

18. A mold of the class described, including in combination a base, a ram head, a plurality of groups of matrices on said base, means to hold said matrices in place, a plurality of groups of ram segments on the ram, one of the ram segments in each group being fixed on the ram head, the other ram segments of each group being floatingly supported on the ram head, means associated with each group to draw the other two segments tight against the fixed segment to clamp the web segments between them, means to actuate the ram to cause the ends of the web segments to enter suitable plastic material in the matrices, and means to guide the ram head relatively to the base.

19. In a mold of the class described, the combination of two adjacent matrices, means to hold them in position, a ram, two end ram members, an intermediate ram member, said members being arranged adjacent to each other and supported on the ram, the intermediate member extending over half of each of the matrices, and the end members extending over the other half of each of the matrices, means to draw said members tight against each other to clamp web-like elements between them, and means to actuate the ram to cause said members to co-operate with the matrices to form a type segment of suitable material in the matrices and to cause the edges of the web elements to press into said material.

20. In a mold for forming a type segment on a segmental web, the combination of a plurality of matrices, a holder therefor, the holder having an arcuate groove therein, each matrix being arcuate and each having types on its concaved face, all of the matrices fitting into said groove and being located side by side, each matrix comprising two sections placed end to end, a single locator to position all of the matrix sections circumferentially in the groove, a ram, a plurality of segments on the ram to form with the matrices a plurality of arcuate channels, means for clamping the webs between the ram segments, an abutment to be engaged by the two sections to position them circumferentially of the flat segment, means to guide the ram for movement towards the holder, and two spring-pressed plungers associated with each matrix, the plungers being supported on the ram to engage the ends of the matrix sections to press them towards each other and against the abutment while the ram is being moved towards the holder.

21. A mold to form a type shuttle having a type segment and a segmental web thereon, said mold including a matrix, a holder therefor, a ram head, a ram segment fixed to said head, a bolt extending through the ram segment, a floating ram segment on said bolt, devices to guide the floating ram segment on one of the ram segments for movement towards and away from the other ram segment, said means being also effective to locate the web portion properly between the ram segments, and means whereby the floating segment may be pressed tightly towards the fixed segment to clamp the web therebetween.

22. In a mold for producing curved type shuttles each comprising a type segment and a flat segmental web thereon, the combination of a matrix holder having a concaved groove, segmental matrices to be placed in said groove, means to locate the matrices axially of said groove, a rib in said groove to locate the matrices circumferentially of the groove, a ram, segments on said ram to fit into the matrices and to form channels with the matrices, means whereby the segmental webs may be clamped between the segments, and means to guide the ram relatively to the matrix holder.

23. A mold to form a type shuttle having a type segment and a segmental web thereon, said mold including a matrix, a holder therefor, a ram head, a ram segment fixed to said head, a bolt extending through the ram segment, a plurality of floating ram segments on said bolt, means to guide the ram segments relatively to each other, means on the ram segments to locate the web portion between them, and a nut on said bolt whereby the segments may be drawn together to clamp the segmental webs.

24. A mold to form a type shuttle comprising a type segment and a thin, pre-formed, web-like flange member thereon, said mold including a concaved matrix of two segmental sections placed end to end, a holder therefor, each section having types, and a segmental element to form with the matrix an aperture in which the type segment is molded of suitable material, the segmental element having a slot into which the web-like element may be placed with only its edge exposed so that said edge may be pressed into said material while the type segment is being molded, the matrix being composed of said sections to permit removal of the type segment therefrom after molding.

25. In a mold for producing curved type shuttles, each comprising a type segment and a flat segmental web extending therefrom, the combination of a matrix holder having a concaved groove therein, segmental matrices in said groove, means to locate the matrices axially of said groove, a rib between the matrices and the holder to locate the matrices circumferentially of the groove, a ram, a segment fixed to said ram, a plurality of segments supported on the ram for movement endwise of the fixed segment, means to clamp the segments against each other and against the fixed segment to hold the segmental webs between them, with their outer edges exposed, and means to guide said ram relatively to said matrix holder so that said segments may be moved into the matrices to close the mold whereby the type segments are formed.

26. In a mold for making a type shuttle comprising a type segment and a thin segmental web thereon, the combination of a concaved matrix, a segmental device to form therewith a closed duct, means whereby the segmental web may be supported on the segmental device with its outer edge exposed, pressure means to force moldable material around in said channel to form the type segment against the edge of the segmental web, said matrix being composed of two segmental sections placed together end to end, and means to prevent the spreading of said sections while the pressure means is active.

27. In a mold for making a type shuttle comprising a type segment and a thin segmental web thereon, the combination of a concaved matrix, a segmental device to form therewith a closed channel, means to locate the segmental web on the segmental device so that the outer edge of the segmental web extends into the closed channel, said matrix being composed of two segmental sections placed end to end, a holder for said matrix, a ram to support said segmental device, means to cause said segmental device to cooperate with said matrix to press the moldable material around in said channel, dams in the opposite ends of the matrix and extending crosswise of the channel to determine the ends of the type segment, and means on said ram to prevent spreading of the matrix sections while the moldable material is being pressed.

28. In a mold for making a type shuttle comprising a type segment and a thin segmental web thereon, the combination of a detachable concaved matrix, a holder therefor, a segmental device to form therewith a closed duct, a ram to support the segmental device, means whereby the segmental web may be supported on the segmental device with its outer edge exposed, means to locate the segmental web circumferentially of the segmental device, means on said holder for positioning the matrix circumferentially of the segmental web, and pressure means to force the moldable material around the channel, the type matrix comprising two sections placed end to end, and the means which supports the segmental device serving to prevent spreading of said sections while the pressure means is acting.

29. In a mold for making a type shuttle comprising a type segment and a thin segmental web thereon, said mold including a matrix, a holder therefor, a ram, two members on said ram between which the segmental web may be inserted, said members forming with the matrix a segmental duct to mold the type segment, and means to draw said members tightly towards each other to clamp the segmental web.

30. In a mold for making a type shuttle comprising a type segment and a thin segmental web thereon, said mold including a matrix, a holder therefor, a ram, two members on said ram between which the segmental web may be inserted, said members forming with the matrix a segmental duct to mold the type segment, means to separate said members to permit the insertion of the segmental web therebetween, and means to clamp said members together to grip the segmental web.

31. In a mold for making a type shuttle comprising a type segment and a thin segmental web thereon, said mold including a matrix, a holder therefor, a ram, two members on said ram between which the segmental web may be inserted, said members forming with the matrix a segmental duct to mold the type segment, a spring to separate said members so that the segmental web may be inserted between them, and means including a bolt to clamp said members together to grip said segmental web.

32. In a mold for making a type shuttle comprising a type segment and a thin segmental web thereon, said mold including a matrix, a holder therefor, a ram, two members on said ram between which the segmental web may be inserted, said members forming with the matrix a segmental duct to mold the type segment, a spring tending to separate said members to permit the insertion of the web segment between them, a spring to overcome the action of the first mentioned spring, and means to render the second mentioned spring ineffective to permit the first mentioned spring to spread the ram members.

33. In a mold for making a type shuttle comprising a type segment and a thin segmental web thereon, said mold including a matrix, a holder therefor, a ram, two members on said ram between which the segmental web may be inserted, said members forming with the matrix a segmental duct to mold the type segment, a spring tending to separate said members to permit the insertion of the web segment between them, a spring to overcome the action of the first mentioned spring, means to render the second mentioned spring ineffective to permit the first mentioned spring to spread the ram members, and means to lock the rendering means in its operated position.

34. In a mold to form a plurality of type shuttles each comprising a type segment and a segmental web extending therefrom, the combination of a holder having a plurality of concaved grooves therein, a set of matrices detachably supported in each of said grooves, a ram, a plurality of sets of segments on said ram, one set for each set of matrices and co-operating therewith to form segmental channels, each set of segments comprising a fixed segment and a plurality of segments movable endwise of the fixed segment for the purpose of gripping segmental webs therebetween, and individual means for each set of ram segments for clamping them together.

35. In a mold for producing a type shuttle comprising a type segment with types on its convexed side and a segmental web extending from the convexed side, a matrix including two sections placed end to end and having a concaved type face, a holder by which the matrix sections are detachably supported, a ram, a segment on said ram to cooperate with said matrix to mold the type segment, means to press the matrix sections together, and means to lock them against displacement during the molding operation.

36. In a mold for producing a type shuttle comprising a type segment with types on its convexed side and a segmental web extending from the convexed side, a detachable matrix having a concaved type face, a holder into which said matrix may be placed, means to definitely position the matrix on said holder, a ram, means independent of said holder to guide said ram towards and away from said holder, a segmental device on said ram to co-operate with said matrix to mold the type segment, and means to hold the segmental web on the segmental device to prevent it from dropping from said segmental device and whereby said web is located accurately transversely of the matrix, said matrix being removable from said holder to permit its removal from the type shuttle after molding.

37. In a mold for making a type shuttle comprising a type segment and a thin web segment extending therefrom, the combination of a matrix having a concaved face, said face having a groove extending in the direction of its curvature, a row of types in the bottom of said groove and extending lengthwise thereof, a segmental device extending downwardly, means for bringing said device into the matrix to form a closed channel, said segmental device including two members between which the web segment may be clamped to keep it from dropping therefrom and to locate it transversely of the row of types, means whereby the web segment may be located on the segmental device so that its outer edge extends from said device, pressure means whereby plastic material may be forced around in said closed channel and against the edge of the web segment extending from said device, and means on the matrix to determine the thickness of the type segment being molded.

38. A mold to form a type shuttle comprising a type segment and a thin, pre-formed, web-like flange member thereon, said mold including a concaved matrix, and a segmental device extending downwardly thereinto, means to bring said device against the matrix to form therewith a channel for the material forming the type segment, means to guide said segmental device to accurately locate it in its effective position and to properly extend into the concaved matrix, and means to clamp the flange member on the segmental device with its outer edge exposed to keep it from dropping from said segmental device while the latter is being inserted into the matrix, so that said outer edge may be pressed into the material of the type segment, and means to determine the thickness of said type segment.

CHARLES A. FUCHS.